(12) United States Patent
Chen

(10) Patent No.: US 10,040,503 B2
(45) Date of Patent: Aug. 7, 2018

(54) FOOT PLACEMENT SENSOR AND SELF-BALANCING PERSONAL TRANSPORTATION DEVICE HAVING SAME

(71) Applicant: Shane Chen, Camas, WA (US)

(72) Inventor: Shane Chen, Camas, WA (US)

( * ) Notice: Subject to any disclaimer, the term of this patent is extended or adjusted under 35 U.S.C. 154(b) by 0 days.

(21) Appl. No.: 15/406,779

(22) Filed: Jan. 15, 2017

(65) Prior Publication Data
US 2017/0217529 A1 Aug. 3, 2017

Related U.S. Application Data

(60) Provisional application No. 62/279,166, filed on Jan. 15, 2016.

(51) Int. Cl.
*B62K 11/00* (2006.01)
*G01V 8/20* (2006.01)

(52) U.S. Cl.
CPC .............. *B62K 11/007* (2016.11); *G01V 8/20* (2013.01)

(58) Field of Classification Search
None
See application file for complete search history.

(56) References Cited

U.S. PATENT DOCUMENTS

| | | | | |
|---|---|---|---|---|
| 5,971,091 A * | 10/1999 | Kamen | ..................... | A61G 5/04 180/218 |
| 6,408,240 B1 * | 6/2002 | Morrell | .................. | A63C 17/12 180/197 |
| 7,481,291 B2 * | 1/2009 | Nishikawa | ............. | B62K 17/00 180/181 |
| 7,740,099 B2 * | 6/2010 | Field | ...................... | A63C 17/01 180/282 |
| 8,041,456 B1 * | 10/2011 | Blackwell | .............. | B25J 9/1674 318/568.12 |
| 8,160,747 B1 * | 4/2012 | Blackwell | ................ | B25J 9/162 700/245 |
| 8,442,661 B1 * | 5/2013 | Blackwell | .............. | B25J 9/1689 700/245 |
| 9,376,155 B2 * | 6/2016 | Ying | .................... | B62D 51/001 |
| 9,400,502 B2 * | 7/2016 | Kamen | .................. | A63C 17/01 |
| 9,598,141 B1 * | 3/2017 | Doerksen | ................. | B62M 7/12 |
| 9,682,732 B2 * | 6/2017 | Strack | .................. | B62K 11/007 |
| 9,755,485 B1 * | 9/2017 | Doerksen | ................. | H02K 9/22 |
| 2009/0108553 A1 * | 4/2009 | Serai | ..................... | B62K 11/007 280/80.1 |
| 2010/0114468 A1 * | 5/2010 | Field | ...................... | B60N 2/045 701/124 |
| 2012/0166048 A1 * | 6/2012 | Inoue | ................... | G05D 1/0061 701/49 |

(Continued)

*Primary Examiner* — John D Walters
*Assistant Examiner* — Hilary L Johns

(57) ABSTRACT

Foot placement sensor and self-balancing vehicles having same. The foot placement sensor may be configured in or with a self-balancing transportation device that has a least a first foot platform. The sensor may include an emitter of electromagnetic radiation (or other suitable signal) that is propagated, at least in part, over a portion of the foot platform and a receptor positioned to receive this emission. Interruption of the emitted radiation at the receptor may indicate the presence of a user's foot at the platform. One suitable emission type is infrared light, among other suitable types. Various embodiments are disclosed including in two-wheel, one-wheel and paired-wheel self-balancing vehicles.

20 Claims, 3 Drawing Sheets

(56) References Cited

U.S. PATENT DOCUMENTS

| | | | |
|---|---|---|---|
| 2013/0238231 A1* | 9/2013 | Chen | B62K 3/007 701/124 |
| 2013/0248573 A1* | 9/2013 | Kim | A45F 4/02 224/576 |
| 2014/0326525 A1* | 11/2014 | Doerksen | A63C 17/12 180/181 |
| 2015/0008058 A1* | 1/2015 | Sato | A63C 17/011 180/181 |

* cited by examiner

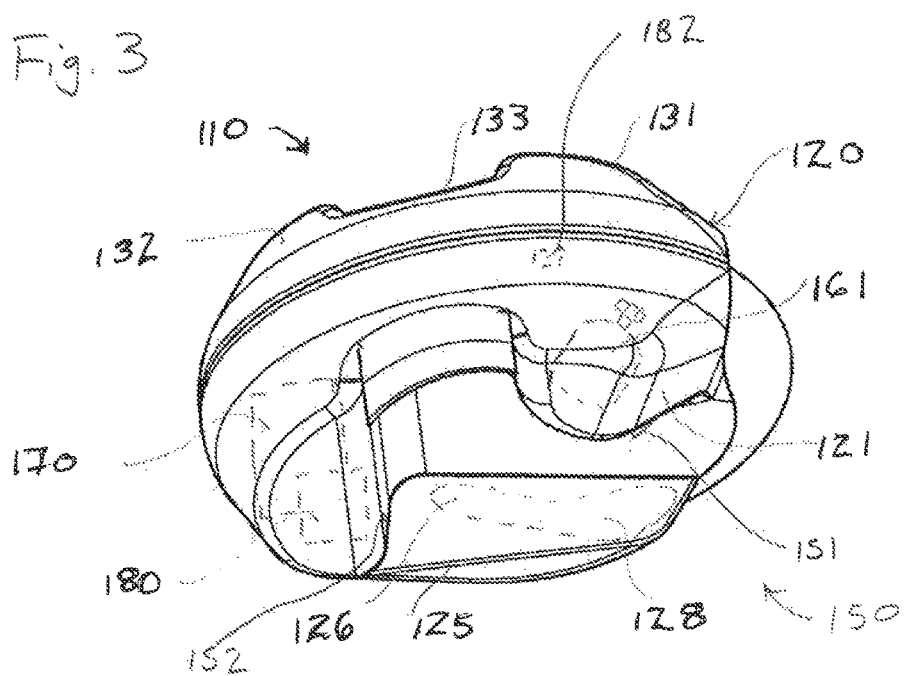
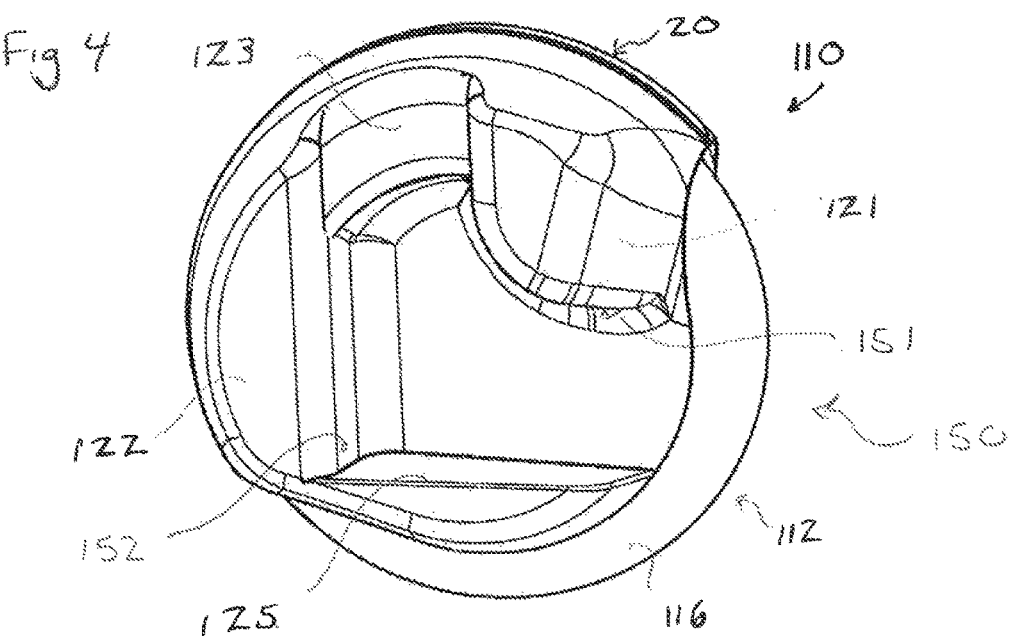

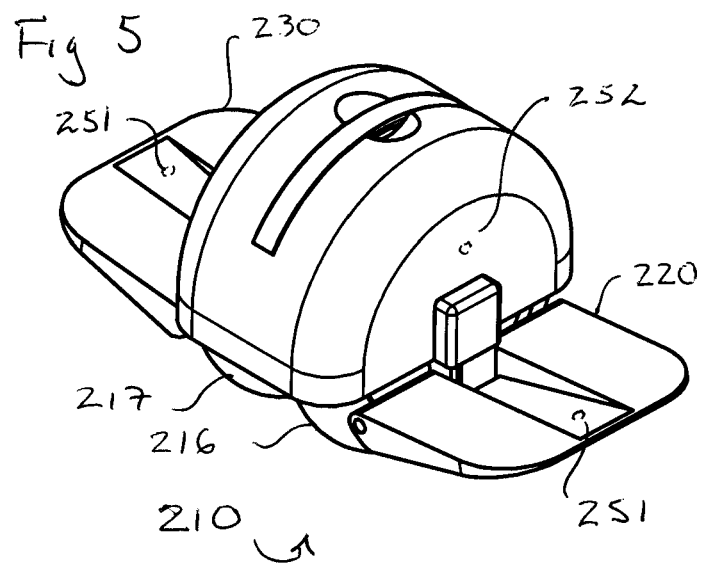

FOOT PLACEMENT SENSOR AND SELF-BALANCING PERSONAL TRANSPORTATION DEVICE HAVING SAME

CROSS REFERENCE TO RELATED APPLICATIONS

This application claims the benefit of U.S. Provisional Application No. 62/279,166, filed Jan. 15, 2016, and having the same title and inventor as above.

FIELD OF THE INVENTION

The present invention relates to self-balancing personal transportation devices and, more specifically, to foot presence or foot position based activation of such devices. The present invention is particularly well suited for use in two-wheel self-balancing devices that have independently movable wheels, though may be used in other devices, for example, but not limited to, single wheel and single wheel-structure devices.

BACKGROUND OF THE INVENTION

U.S. Pat. No. 8,738,278 (the '278 patent) to Shane Chen, the inventor herein, discloses a Two-Wheel Self-Balancing Vehicle with Independently Movable Foot Placement Sections. This patent is hereby incorporated by reference as though disclosed in its entirety herein.

Since the development and disclosure of the device of the '278 patent, knock-off devices have been manufactured and widely marketed. In popular culture, these devices may be referred to as "hoverboards."

The devices are battery powered. In an effort to conserve power and to quickly stop the device when a rider dismounts (or falls off), the devices may include a foot sensor that is configured along with their associated control electronics to turn off self-balancing when a rider is no longer on the platform. This arrangement conserves power.

One type of prior art foot sensor is a pressure (or weight based) sensor, detecting when a user is standing on the platform. These sensors are typically mounted to the surface of the foot platform and include an internally disposed movable member. When weight is applied to the sensors, the movable member is displaced such that it activates a transducer or breaks a light beam, etc., to generate a signal. Various pressure sensors are known in the art.

The pressure sensors are disadvantageous in that they include a moving part and thus are more likely to fail. They are also disadvantageous in that, in the context of a self-balancing transportation device, they require sufficient pressure precisely delivered to the sensor. When (re)activating the device, this may necessitate a rider bending over and holding the device while attempting to apply pressure of sufficient force and direction to trip the sensor, or awkwardly hooking the device with one foot and trying to apply that pressure.

Another type of sensor is a proximity sensor. Proximity sensors typically consist of an emitter and a co-housed detector. They emit electro-magnetic radiation and detect radiation that is reflected back. Infrared is a known type of electro-magnetic radiation, among others, used in proximity sensors.

The infrared proximity sensors, however, are disadvantageous in that when shoes are worn that are not sufficiently reflective, for example, duller black shoes, there is insufficient reflection for the sensor to function properly. Thus, they may falsely indicate the absence of a rider and de-activate self-balancing with a dull, dark shoed rider is actually on the device.

Hence, a need exists for a foot sensor arrangement for a self-balancing personal transportation device that has no or fewer moving parts, works regardless of the reflectivity of the rider's footwear, and/or that allows a user to activate self-balancing in an ergonomically-friendly manner, i.e., without a rider bending over or awkwardly trying to position the device for mounting, among other needs.

SUMMARY OF THE INVENTION

Accordingly, it is an object of the present invention to provide a foot presence sensor for a self-balancing personal transportation device that overcomes the shortcomings of the prior art.

It is another object of the present invention to provide a foot presence sensor for a self-balancing personal transportation device that incorporates such a foot placement sensor.

It is also an object of the present invention to provide a foot presence sensor that propagates an emission over a portion of a foot platform and detects the emission with a detector spaced from the emitter.

These and related objects of the present invention are achieved by use of a foot presence sensor and self-balancing personal transportation device having same as described herein.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIGS. 3-4 are upper right side and mid-right side perspective views (from the perspective of a rider), respectively, of a single-wheel structure, self-balancing transportation device having a foot presence sensor.

FIG. 5 is a perspective view of a single wheel structure self-balancing personal transportation device having a foot presence sensor in accordance with the present invention.

DETAILED DESCRIPTION

Figure 1:
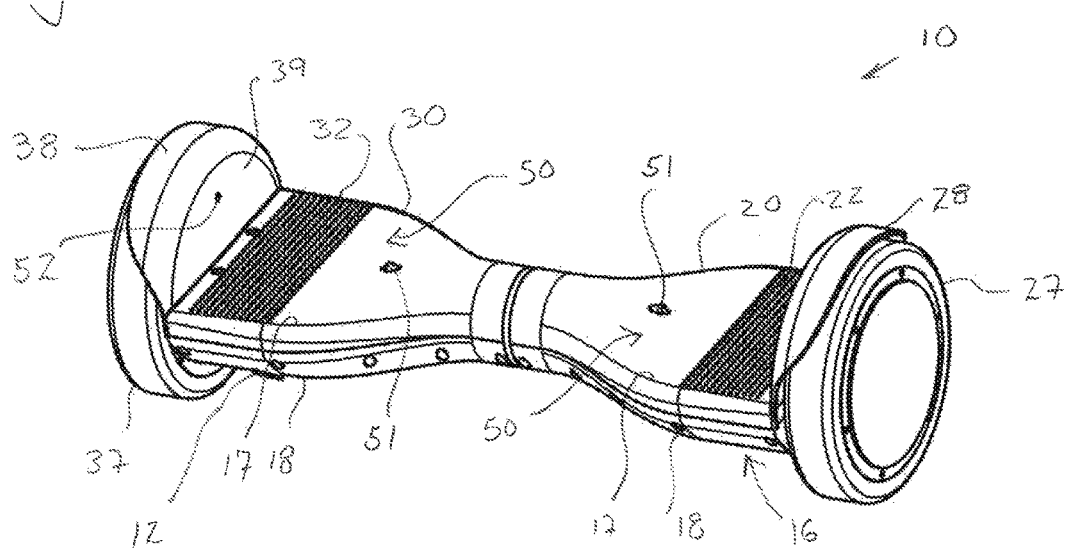
FIG. 1 is a perspective view of a self-balancing personal transportation device having a foot presence sensor in accordance with the present invention.

Referring to FIG. 1, is a perspective view of a self-balancing personal transportation device 10 having a foot presence sensor 50 in accordance with the present invention is shown. FIG. 1 illustrates a device with two wheels (arranged laterally to the line of direction of travel). It should be recognized that the present invention may include or be practiced in devices that have a single wheel (FIG. 3) or single wheel-structure (FIG. 5) or other self-balancing devices.

Device 10 may be similar to vehicle 100 of the '278 patent. Device 10 may have a first and a second platform section 20,30. Each platform section 20,30 may include a housing 16 formed of a top housing member 17 and a bottom housing member 18. Each platform section 20,30 preferably has a foot contact surface 22,32, respectively, on which a rider places his or her feet during use. A wheel 27,37 is preferably coupled to and associated with each platform section 20,30, respectively, and a fender 28,38 may shield each wheel. Fenders 28,38 may include a side wall 29,39, though only side wall 39 is visible from the perspective of FIG. 1 (side wall 29 is arranged symmetrically with side wall 39 about a central vertical plane in the line of direction of travel of the device).

The two platform sections are preferably movable rotationally with respect to one another to afford independent movement of the platform sections and independent driving and control of their respective wheels. It should be recognized, however, that the platform sections may be non-independently movable or movable other than by rotation, e.g., a flexible platform frame, etc., without departing from the present invention.

FIG. 1 illustrates two foot presence sensors 50, each associated with one of the foot platform sections. In the embodiment of FIG. 1, these sensors preferably include an emitter 51 and a receptor or detector 52 (receptor and detector are intended to be used interchangeably herein). Suitable emitters and receptors/detectors are known in the art.

Emitter 51 may be positioned inwardly of foot contact surface 22,32 and receptor 52 is located outwardly of foot contact surface 22,32, on fender wall 29,39, respectively.

In one embodiment, among others, emitter 51 may be an infrared (IR) LED that transmits a beam to its corresponding receptor. Infrared may be characterized as light, not in the visible spectrum, or more generally as electro-magnetic radiation. Various electro-magnetic radiation (and of different frequency) may be used by the foot presence sensors without departing from the present invention.

The infrared signal from transmitter 51 is preferably modulated (by the control processor 73,83 of the respective platform section) to distinguish it from other IR sources. Modulation of IR or other electro-magnetic signals is known in the art.

Emitter 51 preferably produces a substantially linear beam that originates adjacent and propagates over its corresponding foot contact surface. In FIG. 1, the beam diagonally traverses the air space immediately above the foot contact surface. "Over" is generally intended to mean adjacent and spaced from, i.e., above when the platform is horizontal and right side up, and/or such that a user standing on the foot platform would interrupt the beam with his or her foot or lower leg.

It should be noted that the position of the emitter and receptor may be other than as shown in FIG. 1 so long as the beam traverses air space above (i.e., over) the foot contact surface to detect the presence of a foot. The angle, placement, number and beam shape of the emitter and receptor may vary greatly without deviating from the present invention. For example, for each platform section, multiple receptors may be used to detect multiple beams or a "sector" emission or any other arrangement (i.e., shape) of emission from the emitter(s) to receptor(s) over the foot contact surfaces 22,32 may be utilized.

Furthermore, the positions of the emitter and receptor may be reversed with the emitter being on the side wall 29,39 and the receptor on the foot platform. In yet another embodiment, one or more receptor pairs may be mounted on opposing side walls and project a beam across both foot platforms. In this manner, one emitter/receptor pair is sufficient to detect foot presence, yet having a foot presence sensor for each platform section individually provides more precise and efficient control.

Figure 2:
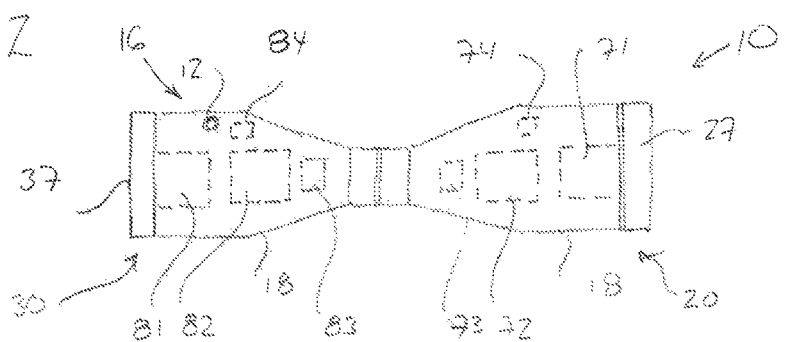
FIG. 2 is a bottom view of transportation device of FIG. 1.

Referring to FIG. 2, a bottom view of transportation device 10 of FIG. 1 is shown. FIG. 2 provides a block diagram of some components within housing 16. These may include motors 71,81, batteries 72,82, electronic control 73,83, and position sensors (such as a gyroscopic sensor) 74,84, respectively. The batteries power the motors which drive the respective wheels. While two electronic controls 73,83 are shown, one electronic control that controls both motors may be utilized. Similarly, a single battery powering both motors may be used. Sensor 74,84 provide position information for their respective platform sections 20,30, respectively. FIG. 2 also illustrates an on-off switch 12. These components are generally known in the art, for example, as taught in the '278 patent. The electronic control is preferably configured such that if at least one of the beams is interrupted, self-balancing is activated or if both are uninterrupted, self-balancing is de-activated. Note that there may be a pre-programmed or user set delay between detection of uninterruption and de-activation.

The housing 16 may be formed of metal, sturdy plastic or other suitable material. The housing members 17,18 may be molded and incorporate strengthening reinforcements, and be shaped to receive and "nest" the internal components (discussed above). The bottom and top housing sections 17,18 are formed complementarily so that after the internal components are installed, the top housing section is fitted onto the bottom housing section and secured with screws or other fasteners. FIG. 1 illustrates holes through which the fasteners are inserted.

In Use

The present invention offers many advantages over prior art devices. One of them is in mounting the device. In prior art devices with pressure or weight based sensors, a user has to bend over and hold the device while mounting or awkwardly try to position the device with one foot and then step on. In the present invention, a user need only pass their foot through the "light" beam and the device springs to position. This may be done with an easy foot movement.

In use, once on-off switch 12 is turned on, self-balancing is preferably activated. This activation may continue for a matter of time (without sensors 50 tripped), likely in the seconds range, before it "times out" and shuts off. There is a balance between ease of use and energy conservation. Similarly, when a ride dismounts, there may be a brief delay before de-activation, for example, to accommodate riders who are attempting to recover or doing stunts. Furthermore, the device is preferably configured so that self-balancing remains active so long as at least one foot is detected on a foot platform section. The amount of delay and whether that delay is set in manufacture or programmable by a user may vary without departing from the present invention.

Referring to FIGS. 3-4, upper right side and mid-right side perspective views (from the perspective of a rider), respectively, of a single-wheel structure, self-balancing transportation device 110 having a foot presence sensor 150 are shown. Note that single wheel structure means that there may be one or more tires mounted to the rim, but if more than one, the tires have a common rim or rims that are fixedly joined to one another such that they have a common axis of rotation and rotate at the same speed, thus acting as a single wheel, yet with more than one tire.

Device 110 may include a wheel 112, having a rim and a tire 116, drive motor(s) 161, battery(ies) 170, electronic control 180, and a position sensor 182, among other components. A housing 120 covers portions of wheel 112 and other components, some of which are shown in phantom line.

FIG. 3 illustrates two "humps" or "protrusions" 121,131 and 122,132 per side (left and right side), with one protrusion 121,131 covering the drive motors and the other protrusion 122,132 covering the batteries. Between these two protrusions is a leg recess 123,133 that may contact, in a preferred embodiment, the inside of the lower leg of a user below or at the knee, during use. A foot platform 125 is located toward a bottom of the device, adjacent a lower portion of wheel 112. The foot platform 125 has a heel region 126 and a ball region 128. A similar foot platform is provided on the other side of the wheel for the rider's left foot (and is substantially symmetrically arranged). The leg recesses 123,133 are substantially aligned over their corresponding heel regions 126,136, respectively.

FIGS. 3-4 also illustrate a foot presence sensor 150 having an emitter 151 and a receptor or detector 152. A foot presence sensors 150 is preferably provided for both feet (i.e., there is a similar arrangement on the left side of device 110). Sensor 150 and the emitter 151 and receptor or detector 152 preferably function in the same manner as sensor 50 and emitter 51 and receptor 52 discussed above. In FIGS. 3-4, the emitter 151 is coupled under protrusion 121 and projects rearwardly towards receptor 152 located above the rear of foot platform section 125 (which is essentially the foot contact surface as described with reference numerals 22,32 with reference to FIG. 1).

As with device 10 of FIG. 1, when a foot is detected by sensor 150 (beam broken), self-balancing is activated and when a foot is not detected, self-balancing is disabled.

The emitter 151 and receptor 152 may be arrange other than as illustrated in FIGS. 3-4 without deviating from the present invention.

Referring to FIG. 5, a perspective view of a single wheel-structure self-balancing vehicle 210 having a foot presence sensor in accordance with the present invention is shown. Device 210 may have two fold out (or fixed, or other) foot platforms 220,230, and two tires 216,217 mounted to a common rim or to coupled-position rims or the like. Foot presence sensors may be provided with each foot platform and may include an emitter 251 and a receptor/detector 252.

Appropriate electronic control, position sensor(s), battery, drive motor, etc., are provided as discussed herein for devices 10 and 110.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A self-balancing vehicle device, comprising:
a first wheel;
a first motor for driving the first wheel;
a first foot platform associated with the first wheel;
a position sensor and electronic control configured such that the electronic control is coupled to the first motor and the first motor drives the device towards fore-aft self-balancing based on data from the position sensor; and
a first foot presence sensor having an emitter that emits an emission and a detector that detects the emission, wherein the emitter and detector are spaced from one another and positioned such that the propagation path of the emission from emitter to detector passes over a portion of the first foot platform.

2. The device of claim 1, wherein the electronic control and first foot presence sensor are configured such that when the emission path from emitter to detector is interrupted, self-balancing is activated.

3. The device of claim 1, wherein the electronic control and first foot presence sensor are configured such that when the emission path from emitter to detector is uninterrupted, self-balancing is de-activated.

4. The device of claim 1, wherein the emission is an electromagnetic radiation emission.

5. The device of claim 1, wherein the emission is an infra-red emission.

6. The device of claim 1, wherein the emission is modulated.

7. The device of claim 1, wherein the emitter and detector are positioned such that a portion of the body of a rider interrupts the emission path when a rider is standing on the first foot platform.

8. The device of claim 1, further comprising:
a second wheel;
a second motor for driving the second wheel;
a second foot platform associated with the second wheel;
a second foot presence sensor having an emitter that emits an emission and a detector that detects that emission, wherein the emitter and detector are spaced from one another and positioned such that the propagation path of the emission from emitter to detector passes over a portion of the second foot platform.

9. The device of claim 8, wherein the electronic control and the first and second foot presence sensors are configured such that when the emission of the first or second foot presence sensor is interrupted then self-balancing is activated, and when both the emissions of the first and second foot platforms are uninterrupted then self-balancing is de-activated.

10. The device of claim 8, wherein the first and second foot platforms are spaced so as to have an interior side therebetween and an exterior side substantially opposite the interior side, and wherein each foot presence sensor has one of the respective emitter and detector on the interior side and the other of the emitter and detector on the exterior side, so that the emission path is over the respective foot platform.

11. The device of claim 1, wherein the first foot presence sensor includes a second emitter that emits an emission and a second detector that detects the emission, wherein the second emitter and second detector are spaced from one another and positioned such that the propagation path of the emission from second emitter to second detector passes over a portion of the first foot platform.

12. The device of claim 1, further comprising:
a second wheel;
a second motor for driving the second wheel; and
a second foot platform associated with the second wheel;
wherein the emitter and detector are arranged such that the path of the emission passes over a portion of both the first foot platform and the second foot platform.

13. A self-balancing vehicle device, comprising:
a first foot platform with an associated first wheel and a second foot platform with an associated second wheel;

a first motor that drives the first wheel and a second motor that drives the second wheel;

electronic control and position sensing that are configured to drive the first and second wheels towards self-balancing the device; and a first foot presence sensor having a first emitter that emits a first emission and a first detector that detects the first emission, wherein the first emitter and first detector are spaced from one another and positioned such that the propagation path of the first emission passes over a portion of the first foot platform.

14. The device of claim 13, further comprising:

a second foot presence sensor having a second emitter that emits a second emission and a second detector that detects the second emission, wherein the second emitter and second detector are spaced from one another and positioned such that the propagation path of the second emission passes over a portion of the second foot platform.

15. The device of claim 13, wherein the first emission is modulated electro-magnetic radiation.

16. The device of claim 13, wherein the first and second foot platforms are movable with respect to one another.

17. A self-balancing vehicle device, comprising:

at least one wheel;

a motor for driving the wheel;

a foot platform associated with the wheel;

a position sensor and an electronic control circuit configured such that the motor drives the device towards fore-aft self-balancing based on data from the position sensor; and a foot presence sensor having an emitter and receptor, the receptor spaced from the emitter, and wherein, the emitter propagates electro-magnetic radiation over the foot platform in such a manner that if a rider is standing on the foot platform, part of the rider's body interrupts the path of electro-magnetic radiation from the emitter to receptor.

18. The device of claim 17, wherein the electronic control and first foot presence sensor are configured such that when the emission path from emitter to detector is interrupted, self-balancing is activated.

19. The device of claim 17, wherein the emission is a modulated electromagnetic radiation emission.

20. The device of claim 17, wherein the position sensor is a gyroscopic sensor.

\* \* \* \* \*